United States Patent [19]

Leiber et al.

[11] Patent Number: 4,460,963
[45] Date of Patent: Jul. 17, 1984

[54] VEHICULAR ANTI-SKID BRAKING SYSTEM

[75] Inventors: Heinz Leiber, Oberriexingen; Dieter Roller, Herrenberg; Volker Braschel, Heilbronn, all of Fed. Rep. of Germany

[73] Assignee: Robert Bosch GmbH, Stuttgart, Fed. Rep. of Germany

[21] Appl. No.: 424,242

[22] Filed: Sep. 27, 1982

[30] Foreign Application Priority Data

Jan. 13, 1982 [DE] Fed. Rep. of Germany ....... 3200725

[51] Int. Cl.³ .................................................. B60T 8/08
[52] U.S. Cl. ..................................... 364/426; 303/97; 303/105
[58] Field of Search .............. 364/426; 303/92, 95–97, 303/105, 106

[56] References Cited

U.S. PATENT DOCUMENTS

| | | | |
|---|---|---|---|
| 4,059,312 | 11/1977 | Jonner | 303/92 |
| 4,088,376 | 5/1978 | Lindemann et al. | 303/96 |
| 4,260,199 | 4/1981 | Reinecke | 303/96 |

*Primary Examiner*—G. Z. Rubinson
*Assistant Examiner*—Saul M. Bergmann
*Attorney, Agent, or Firm*—Frishauf, Holtz, Goodman & Woodward

[57] ABSTRACT

To permit operation of an anti-skid or anti brake-lock system with wheels having dual braking cylinders, controlled by separate braking valves, control signals to control separate brake valves ($V_{11}$, $V_{12}$) at respective sides of the vehicle are derived for a first braking system (I) in accordance with well known technology, based on wheel acceleration, deceleration and the like, processed in an anti-skid control unit (9), and a second braking system, controlled by a single valve ($V_2$), is provided connected to the second braking cylinders in both wheels. The control signals for the second valve ($V_2$) are generated as a function of the signals arising in the first system (I) by a logic circuit (15–25) including timing elements (15, 16, 19, 21) responsive to leading and trailing flanks, respectively, of opening and closing signals arising in the first braking system (I) under command of the wheel anti-lock or anti-skid control unit (9), to drop braking pressure in the second system (II) if unstable operation of the wheels, based on braking in the first system (I) occurs, and raising braking pressure only after a time delay (19; $T_2$) if an increase in braking pressure in the first system occurred. As an override safety, response of the braking control unit (9) is indicated by a separate override signal, absence of which leaves the second braking system (II) unaffected, but presence thereof prevents raising of braking pressure in the second system during response of the anti-skid unit and controlling the first system.

9 Claims, 7 Drawing Figures

VEHICULAR ANTI-SKID BRAKING SYSTEM

The present invention relates to a braking system for vehicles, and more particularly to a braking system which includes anti-skid, or automatically controlled wheel slip features.

BACKGROUND

Various types of braking systems for vehicles are known in which, for safety, the wheels of the front axle of the vehicle are equipped with two independent braking systems. If one should fail, the other would still be operative. Numerous governmental regulations require dual braking systems for safety of operation.

THE INVENTION

It is an object to permit utilization of vehicle anti-skid systems with braking systems on which independent braking subsystems I and II are provided for the vehicle, without duplicating the control loops for any one single such system.

Briefly, control signals for operating the anti-skid valves or the anti-skid system of two braking systems, I and II, are provided; the signals of one braking system (I) are used to control the other, that is, braking system II; the signals which control the second braking system are derived from and based on the signals which are generated to control the first braking system (I).

The arrangement has the advantage that, although independent braking control circuits may be present for safety reasons, the number of control loops need not be increased.

In accordance with a feature of the invention, which results in a particularly simple construction, one braking system is provided which applies braking pressure to wheels for both sides of the vehicle over respectively separate valves; the second braking system, then, will have a common braking valve for both wheels. The pressure in the second braking system is controlled as a function of the first braking system. This substantially decreases the components and structural requirements for the overall braking system of the vehicle.

High operating safety is obtained if the second braking system is so arranged that the braking pressure, upon response of the anti-lock or anti-skid system, can only be dropped or maintained constant at best; the second braking system will not be capable of building up increasing braking pressure. Thus, since increased braking pressure cannot be derived from the second system, instability in operation is prevented.

The reliability of operation and safety of vehicle operation can be still increased, in accordance with a feature of the invention, by so arranging the response circuit that the second braking system will not respond to an increase in braking pressure if the anti-skid or anti-brake lock feature of the first braking system has responded.

DRAWINGS

DETAILED DESCRIPTION

Figure 1:
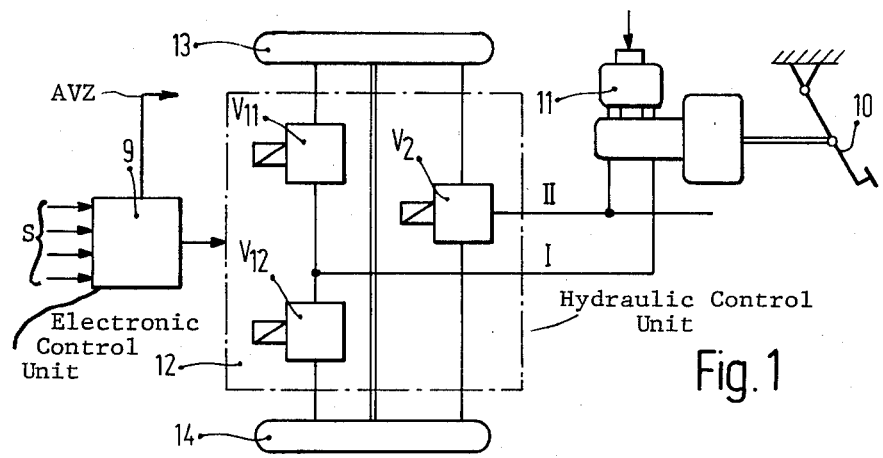
FIG. 1 is a schematic block diagram of a braking system.

A brake pedal 10 (FIG. 1) is connected to control a brake cylinder 11 which is connected to a hydraulic braking system 12. Hydraulic braking system 12 is connected to hydraulically operate the braking cylinders in wheels 13, 14. The hydraulic unit 12 is controlled by an electronic control unit 9, as well known in anti-skid braking technology. The electronic control unit 9 receives input signals, as schematically indicated by arrows S, representative of vehicle and speed and wheel speed parameters, for example speed of respective wheels, speed of the vehicle, acceleration and deceleration of wheels and of the vehicle, and the like. The braking pressure supplied by the hydraulic control unit 12 is controlled in accordance with those signals, as well known.

The wheels 13, 14 are shown schematically and, respectively, may be two wheels on one side of the vehicle. Each one of the wheels on the sides of the vehicles has two brake cylinders, connected to separate, respective braking circuits or braking subsystems I, II. The braking subsystem I has two valves $V_{11}$, $V_{12}$ which are associated with the respective wheels 13, 14 at the two sides of the vehicle. The braking subsystem or braking circuit II has a common valve $V_2$ for the wheels 13, 14 at the two sides of the vehicle.

Nomenclature: The valves are assigned the letter V. Signals "E" control introduction of pressurized fluid to the respective valve; signals "A" control drainage of pressurized fluid from the respective valve. The subscripts 11, 12 refer to the respective valves 1 and 2 of the braking system I, the subscript 2 refers to the valve of the braking system II.

As well known, if an inlet valve portion is opened by signal E, with the outlet blocked, that is, no signal A (or the A signal at a zero level), braking pressure will increase. If, then, the inlet signal E ceases, the outlet signal still is inactive or zero, the previously applied pressure will be held or maintained. Upon subsequent opening of the outlet portion of the valve, based on signal A, braking pressure will drop.

Referring again to FIG. 1: The two braking subsystems or circuits I, II act on the wheels of the same axle of the vehicle. It is, then, necessary to match the operation of the respective braking cylinders in the wheels of the two systems I, II with respect to each other. This is particularly important if a wheel anti-skid system, controlled for example by the electronic control unit 9 is present, which, of course, for efficiency must act on both of the braking systems I, II.

In accordance with the present invention, the braking system II is controlled based on the control for the braking system I, in what might be termed a modified slave control.

Figure 2:
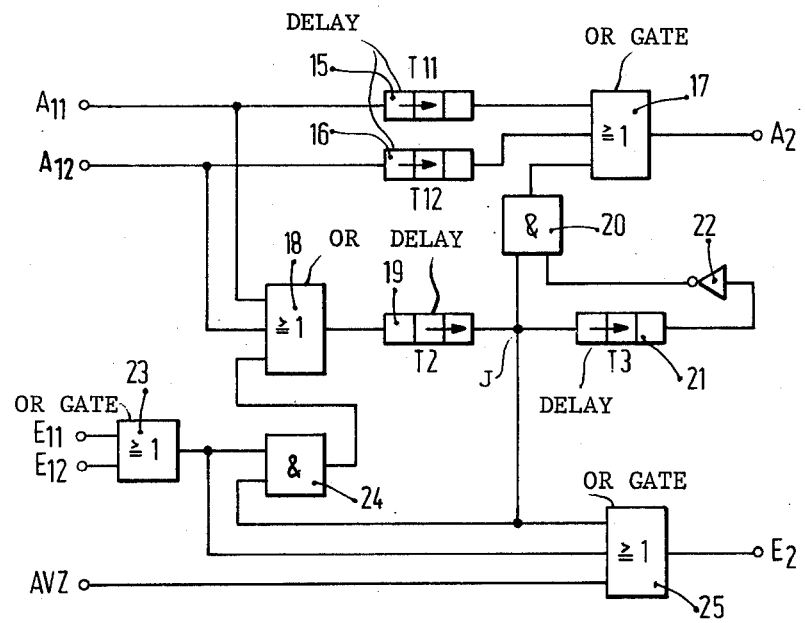
FIG. 2 is a circuit diagram of the system in accordance with FIG. 1, and using a sequencing control.

FIG. 2 illustrates, in block diagram form, the control of braking system II. The signals which are applied are the drain signals $A_{11}$, $A_{12}$ for the respective valves $V_{11}$, $V_{12}$, the inlet or pressurizing signals $E_{11}$, $E_{12}$ for the respective valves $V_{11}$, $V_{12}$, and an indicating or control signal AVZ which indicates that the anti-skid system has responded. The output signals which are to be derived are the control signals for valve $V_2$, namely the drainage or "open" signal $A_2$ and the pressurization or "pressure ON" signal $E_2$.

In accordance with the invention, the control signal for the valve $V_2$, thus, is derived as a function of and dependence on the signals generated for control of the valves $V_{11}$, $V_{12}$, respectively, of the subsystem or control circuit I.

Signals $A_{11}$, $A_{12}$ are applied over a first time delay circuit having a delay time $T_{11}$, and a second time delay circuit 16 having an equal time delay to an OR-gate 17. The output from OR-gate 17 will be the drain signal $A_2$. The signals $A_{11}$, $A_{12}$ are applied to a second OR-gate 18, the outut of which is conducted over a third delay circuit having a delay time $T_2$ to a circuit junction J. Junction J is connected to one input of an AND-gate 20, to one input of a third OR-gate 25, and to an input of a fourth delay circuit 21, having a delay time $T_3$. The output of the AND-gate 20 is connected to the first OR-gate 17. The output of the fourth delay circuit 21 is connected through an inverter 22 as the second input to the AND-gate 20.

The "pressure ON" signals $E_{11}$, $E_{12}$ are connected to a third OR-gate 23, the output of which is connected to one input of a second AND-gate 24. The output of the second AND-gate 24 is connected to a third input of the second OR-gate 18. The second input of the AND-gate 24 is connected to the junction J. The fourth OR-gate 25, likewise connected to the junction J, generates the signal $E_2$. A second input of the fourth OR-gate 25 is connected to the AVZ terminal, which is generated by the electronic control unit 9 always when the electronic control unit 9 is in operation. A third input of the OR-gate 25 is connected to the output of the third OR-gate 23.

Figure 3:
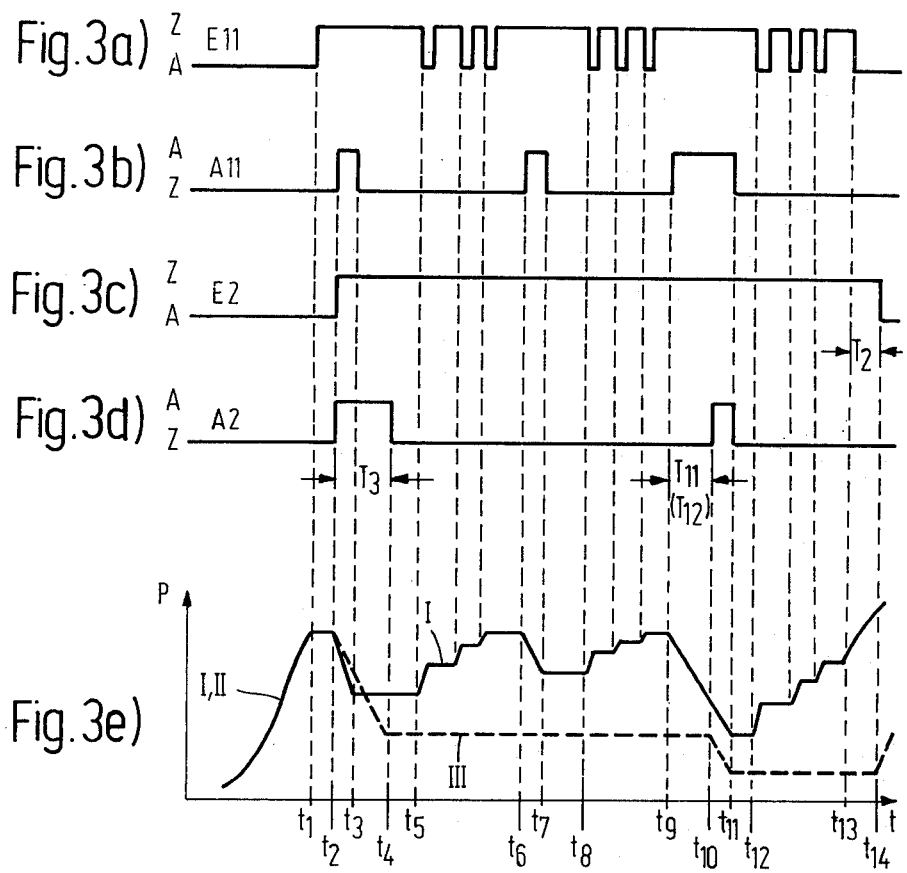
FIG. 3, collectively, shows in FIGS. 3a to 3e a series of graphs.

Operation, with reference to FIG. 3: The respective signals $E_{11}$, $A_{11}$, $E_2$, $A_2$, and the braking pressure p are shown in FIGS. 3a to to 3e with respect to time t, during that period when the anti-skid system is in operation, that is, when the electronic control 9 provides output signals. The signals shown in FIGS. 3a to 3d so control the valves that, when the signals have the level Z, the valve is closed; when the signals have the level A, the valve is open.

It should be noted that the signal $E_{11}$, thus, has a 1-signal when the valve is closed; the opening valve $V_{11}$ will be open when the signal is a 1-signal. The pressure relations in FIG. 3e are illustrated, separately, for the braking systems I and II, the curve for II being shown in broken line, and for the subsystem or circuit I being shown in solid line.

The operation of the valves $V_{12}$ will be symmetrical with respect to that of the valves $V_{11}$, and thus it is not necessary to show the signals $E_{12}$, $A_{12}$. As can be clearly seen from FIG. 2, signals $A_{11}/E_{11}$, and signals $A_{12}/E_{12}$ are connected logically together through similar delay lines 15, 16 and OR-gates 17 and 23, respectively. Thus, the explanation of the operation of the braking system with respect to valve II is sufficient if only the valve $V_{11}$ and signals $A_{11}$, $E_{11}$ are considered. A similar operation, of course, will result based on signals $A_{12}$ and $E_{12}$ upon control of valve $V_{12}$.

The delay lines 15, 16, 21 operate differently from delay line 19, which is also indicated by the different symbols used. The delay elements 15, 19, 21 provide delay of the rising flank of the signal which occurs; the delay element 19 delays the trailing flank of the respective signals. This is shown, schematically, by the different positions of the arrows within the delay lines in FIG. 2.

The braking pressure p of the braking subsystems I, II will be the same up to time $t_1$. At time $t_1$, valve $V_1$ will close (see FIG. 3a), so that the braking pressure in both subsystems I, II will be held constant. Let it be assumed that the control unit 9, due to sensing of excessive left wheel deceleration, commands, at time $t_2$, opening of the drain valve or drain portion of the valve $V_{11}$, as illustrated by the signal $A_{11}$—FIG. 3b. The signal $A_{11}$ provides a control signal through the OR-gate 18 to the third delay element 19, which delays the trailing flank thereof. The signal $A_{11}$, thus, is at first immediately connected to the junction J and thus provides an enabling signal to AND-gate 20. The second input of the AND-gate 20, at that time, has a 1-signal applied thereto since the fourth delay element 21 delays the rising flank, so that the output therefrom is still a 0-signal which is inverted by the inverter 22 to provide a second 1-signal to the first AND-gate 20. This provides an output signal from OR-gate 17 which will be the $A_2$ signal—see FIG. 3d—occurring at time $t_2$. The $A_2$ signal will remain ON for the delay period $T_3$ of the delay line 21. After elapse of the delay period $T_3$, the 1-signal will be inverted by inverter 22 to a 0-signal which is transferred to the second input of the first AND-gate 20, in order to cause drop in pressure in the braking system II, as seen by the broken lines after the time period $t_2$ and until time $t_4$. The fact that valve $V_{11}$ had stopped draining at time $t_3$ is irrelevant with respect to valve $V_2$. This is clearly seen in FIG. 3b, and compare with FIG. 3d, which shows the delay period $T_3$.

As seen in FIG. 3a, the signal $E_{11}$ continues to be applied except for short interruptions which, however, are less than the delay time $T_2$ of the third delay element 19 so that, due to the feedback of the output signal of the third delay element 19 over the second AND-gate 24 and the second OR-gate 18, the third delay element 19 will be in self-holding position. The signal $E_2$ is thus continuously generated, as illustrated in FIG. 3c. The directly locking controlled subsystem or circuit I will now enter into a pressure constant phase, starting at time $t_3$, which extends up to time $t_5$. At time $t_5$, braking pressure is increased, in steps based on clocked pulses—as well known in automatic braking control—to simulate "brake pumping"; this system has also been called a stutter control, and is well known in the literature in this field. This affects the signal $E_{11}$, as seen in FIG. 3a. Starting at time $t_6$ and, for example, based on a control signal from unit 9, the second cycle of operation of the wheel anti-lock or anti-skid system will start, again opening the outlet portion of valve $V_{11}$—see FIG. 3b. The second braking subsystem or circuit II is not affected, however, since the ON-duration of the outlet valve portion of valve $V_{11}$—see time $t_6$ to $t_7$—is less than the delay time $T_{11}$ which, of course, is the same as the delay time $T_{12}$, of the respective first and second delay elements 15. The delay times are shown in FIG. 3. Consequently, no $A_2$ signal is generated, and the braking pressure of the subsystem II remains constant or even, as seen in the broken line in FIG. 3e. At time $t_8$, a further pressure increase phase for the first system will start, as seen in FIG. 3e, in steps, as between times $t_5$ and $t_6$. This pressure increase phase will last until time $t_9$, at which time the pressure will be dropped in the system I for a longer period and to a greater extent than before, for example under control of the system 9. In contrast to the brake pressure reduction time between $t_6$ to $t_7$, however, the reduction period extends for a longer time, so that the time delay $T_{11}$ of the first delay element 15 is exceeded. Consequently, and after this time $T_{11}$ has passed, the output of the first OR-gate 17 will receive a signal, as clearly seen in FIG. 3d—and compare FIG. 2. The signal $A_2$, thus, will cause opening of the drain valve portion of valve $V_2$ in the braking system II, and drop in braking pressure in system II, as seen by broken line II in FIG. 3 between time $t_{10}$, $t_{11}$.

The braking pressure drop in system I terminates at time $t_{11}$ which, also, causes immediate termination of the $A_2$ signal since the time delay element 15 does not delay the trailing flank of the signal $A_{11}$, so that, upon termination of signal $A_{11}$, signal $A_2$ will immediately cease.

In the interval between time $t_{11}$ to time $t_{12}$, the pressures in both the systems I and II are maintained constant and at a low level. Consequently, the now lightly braked wheels can accelerate, which is sensed and controlled by the electronic control unit to result in output signals permitting again increased braking pressure. Thus, after time $t_{12}$, a stepped, pulse-controlled pressure increase in system I will result. Let it be assumed that the wheels now operate on a gripping surface, so that the deceleration need no longer be controlled by the anti-skid system, and, at time $t_{13}$, the braking pressure can be controlled without influence by the anti-skid system or unit 9. This normal or operator-controlled braking pressure increase in the subsystem I will result due to 0 level or A level of the signal $E_{11}$, that is, permitting opening of the inlet portion of the valve $V_{11}$. If the signal $E_{11}$ continues in the 0 state for a period of time which is no longer than the delay time $T_2$ of the third delay element which, as has been noted responds to the trailing flank, the output signal from the third delay element 19, after time $T_2$ likewise will become a 0-signal, which terminates the self-holding feature of the third delay element 19 and the signal $E_2$ likewise will become a 0-signal, permitting opening of the inlet valve $V_2$ from the time instant $t_{14}$. The time instant $t_{14}$ is delayed by the time $T_2$, as seen in FIG. 3. Thus, after time $t_{14}$, the braking pressure in the subsystem II will operate without control from the electronic control unit 9 of the anti-skid or anti wheel-lock system.

Consequently, a slave control of the slave braking system II will be obtained, which, first, drops the braking pressure therein for a predetermined time if the controlled system I, due to instability of braking of the wheels 13, 14 drops the braking pressure therein. During further control of the system I, the pressure in system II is held constant, until a pressure reduction again results in system I, the time of which exceeds a predetermined interval. Only then will the braking pressure in the slave system II also be dropped further, and then again held constant. The slave system II changes over to normal operation when the braking pressure in system I is increased beyond a predetermined time, as controlled by the time delay $T_2$, that is, the trailing delay of delay element 19.

In accordance with a feature of the invention, signal AVZ is generated, which increases operating reliability, and which is an output signal generated when the electronic control unit responds, that is, when the anti-skid system becomes activated. Such a signal can readily be generated if, for example, an outlet valve of the master system I is open for a period of time longer than a predetermined interval. This, reliably, recognizes that the anti-lock system 9 has responded and is in operation. The continued presence of the signal AVZ is applied to OR-gate 25 which generates a signal $E_2$, so that an increase of braking pressure in the subsystem II is excluded during the operation or effectiveness or control cycles commanded by the control unit 9 of the wheel anti-lock system.

Various changes and modifications may be made, and features described in connection with any one of the embodiments may be used with any of the others, within the scope of the inventive concept.

The present invention can be used with various types of dual braking systems.

We claim:

1. Braking system for a vehicle having
    a brake control element (10);
    a wheel axle, and wheels (13, 14) located at respective sides of the vehicle on said axle;
    a first braking system (I) controlled by said brake control element, connected to and acting on the respective wheels of the vehicle on said axle;
    a second braking system (II) independent of said first braking system and also controlled by said brake control element, connected to and acting on the respective wheels of the vehicle on said axle, the second braking system acting on the wheels, independently of the first braking system;
    and a wheel anti-lock or anti-skid system (9) providing control signals ($E_{11}$, $A_{11}$; $E_{12}$, $A_{12}$) upon sensing of a tendency of at least one of the wheels, upon application of braking pressure thereto, to lock
    wherein
    the control signals derived from said brake anti-lock or anti-skid system (9) are applied to one of the brake systems (I);
    and derivative braking control means (15-25) are provided, connected to and receiving the control signals applied to said one brake system (I) and generating derived control signals ($A_2$, $E_2$) applied to and controlling braking pressure in the second braking system (II) as a function of the nature and timing of the control signals applied to said one control system (I).

2. System according to claim 1, wherein said first braking system (I) includes separate braking valves ($V_{11}$, $V_{12}$) for the wheels (13, 14) located at the respective sides of the vehicle on the axle;
    and wherein a single braking valve ($V_2$) is provided controlling braking pressure in the second system (II) applied to both wheels (13, 14) at the respective sides of the vehicle.

3. System according to claim 1, wherein the derivative braking control means (15-25) includes means (18, 19, 20) sensing reduction of braking pressure in said one braking system (I) and controlling the second braking system (II) to reduce braking pressure therein, and then maintain said braking pressure constant if the brake anti-lock or anti-skid system (9) provides a signal reducing the braking pressure (p) in said one braking system.

4. System according to claim 3, wherein said sensing means includes a timing means (21) controlling reduction of braking pressure in the second braking system (II) for a predetermined time interval ($T_3$).

5. System according to claim 3, wherein said derivative braking control means includes a first timing means (15, 16) and the means sensing reduction of braking pressure include additional braking pressure sensing means (17) connected to control further reduction of braking pressure in the second system (II) if reduction of braking pressure in the first braking system (I) exceeds the time duration ($T_{11}$, $T_{12}$) controlled by said first timing means (15, 16).

6. System according to claim 5, wherein said derivative braking control means is responsive to termination of reduction of braking pressure in said one system (I)

and terminates control of reduction of braking pressure in the second system upon termination of reduction of braking pressure in the first system.

7. System according to claim 1, wherein said derivative braking control means (15-25) includes means (18, 19) first sensing reduction of braking pressure in said one braking system (I) and subsequent increase in braking pressure in said one system and includes a timing element (19), said timing element being responsive to increase of braking pressure after reduction, in said one system (I), for a predetermined time interval ($T_2$) and controlling increase of braking pressure in the second system (II) if the braking pressure in said one system (I) increases beyond said timing interval.

8. System according to claim 7, wherein said means first sensing reduction of braking pressure and subsequent increase thereof is responsive to braking pressure applied to any one of the wheels (13, 14) of the vehicle at the respective sides thereof.

9. System according to claim 1, wherein the wheel anti-lock or anti-skid system (9) provides an output signal (AVZ);

said response signal being connected to and controlling the derived control signals applied to the second braking system (II) to
(a) leave the control signals applied by operator control to the second braking system unaffected upon absence of said response signal, and
(b) preventing increase in braking pressure in said second system (II) upon generation of said response signal above the braking pressure then pertaining in the second system.

* * * * *